(No Model.)
H. C. SPALDING.
ELECTRIC CABLE.
No. 327,494. Patented Sept. 29, 1885.
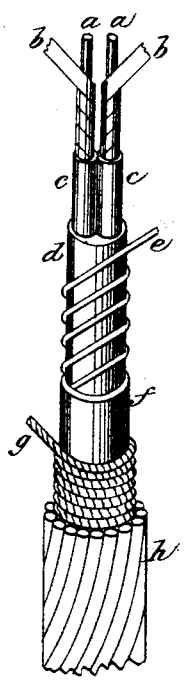
WITNESSES
E. B. Welch
Alex. L. Hayes
INVENTOR
Henry C. Spalding

UNITED STATES PATENT OFFICE.

HENRY C. SPALDING, OF BOSTON, MASSACHUSETTS.

ELECTRIC CABLE.

SPECIFICATION forming part of Letters Patent No. 327,494, dated September 29, 1885.

Application filed December 14, 1883. Renewed February 28, 1885. (No model.)

*To all whom it may concern:*

Be it known that I, HENRY C. SPALDING, a citizen of the United States, residing at Boston, in the county of Suffolk and State of Massachusetts, have invented certain new and useful Improvements in Electric Cables, of which the following is a specification, reference being had to the drawings accompanying and forming a part of the same.

In an application filed by me November 19, 1883, No. 112,205, I have shown and described an electrical cable composed of two insulated conductors forming or adapted to form a complete or round-wire circuit and an insulated metallic sheath inclosing or surrounding said conductors. In thus combining two wires in the same insulated sheath and using them, respectively, as the leading and return conductors of a circuit I have found that dynamic induction and retardation are prevented, this being apparently due to the fact that the opposite polarities cancel or neutralize any inductive electrical disturbances in the sheath, producing in the same what may be termed an "electrical equilibrium."

The subject of my present invention is a cable involving this principle of construction, but differing from that described in the materials used in its composition and in the manner in which they are applied.

When a cable containing a metallic sheath is insulated by layers of textile or fibrous material, it is convenient and economical to use strips of metal foil wound spirally upon the core in forming the sheaths, and to lay such strips so as to form a continuous layer or sheathing. When the layers of insulating material, however, are not of this nature, but are composed of plastic compounds, the entire separation of the layers by continuous sheathings of metal foil and the difficulty of causing a perfect adherence between the metal and the plastic compounds lessen the compactness and flexibility of the cable. I therefore use, instead of metal foil, a spirally-wound wire in those cables in which a plastic compound is used for insulating. The wire is not wound closely, but spaces are left, so that the layers of insulating material on opposite sides of the wire are connected.

The specific construction of this cable is illustrated by the accompanying drawings.

Figure 1 represents a single wire, showing the insulating-coatings thereto. Fig. 3 is a sectional view of the core containing two insulated wires, and Fig. 2 is a portion of a complete cable, showing the several layers or coatings.

The letters $a\ a$ designate the wires which are used for the circuit. Each is insulated by a spirally-wound strip, $b$, of paper and a coating, $c$, of bituminous or resinous varnish—such as that described in my application above referred to. The two wires are brought together and inclosed in a mass, $d$, of gutta-percha or any other plastic insulating material, which is applied by a die or former in any well-known manner, and made round in cross-section. Upon this insulating material is wound spirally the wire $e$, which may be of copper, iron, or other metal. Over the wire is applied a second layer of insulating material, $f$, and the whole is then inclosed by by a closely-wound serving of twine, $g$, and a metallic armor, $h$. The precise means of protecting the insulating-coatings may, however, be greatly varied or even dispensed with.

With the wire $e$ applied under the conditions herein specified a great advantage is gained. The two coats or layers $d$ and $f$ unite and form practically one, in which the wire is embedded. Any arrangement of the conductors $a\ a$ may be used with this insulated sheath.

I am aware that a spirally-wound wire in an electric cable is not new, and I am further aware that sheaths composed of wires insulated by various materials have been used, and these are matters which I do not claim; but, Having described my invention, what I claim is—

1. The combination, with two insulated conductors forming a complete or round-wire circuit, of a spirally-wound wire between layers of plastic insulating material surrounding said conductors, as and for the purpose set forth.

2. The combination, in an electrical cable, of the two separately-insulated wires $a\ a$, the coating of plastic material $d$, the spirally-wound wire $e$, and the coating of plastic material $f$, substantially as herein set forth.

In witness whereof I have hereunto set my name in the presence of two subscribing witnesses.

HENRY C. SPALDING.

Witnesses:
E. B. WELCH,
ALEX. L. HAYES.